United States Patent
Moyer

(10) Patent No.: US 8,918,591 B2
(45) Date of Patent: Dec. 23, 2014

(54) DATA PROCESSING SYSTEM HAVING SELECTIVE INVALIDATION OF SNOOP REQUESTS AND METHOD THEREFOR

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1091 days.

(21) Appl. No.: 12/915,198

(22) Filed: Oct. 29, 2010

(65) Prior Publication Data

US 2012/0110270 A1   May 3, 2012

(51) Int. Cl.
G06F 12/00 (2006.01)
G06F 12/08 (2006.01)

(52) U.S. Cl.
CPC ................................. G06F 12/0831 (2013.01)
USPC ............................. 711/146; 711/118; 711/170

(58) Field of Classification Search
USPC .......................................... 711/146, 118, 170
See application file for complete search history.

(56) References Cited

U.S. PATENT DOCUMENTS

| 4,740,889 | A | 4/1988 | Motersole et al. |
| 5,644,788 | A | 7/1997 | Courtright et al. |
| 2002/0026569 | A1* | 2/2002 | Liao et al. ................ 712/4 |
| 2004/0039886 | A1 | 2/2004 | Christofferson et al. |
| 2006/0224835 | A1* | 10/2006 | Blumrich et al. ........... 711/146 |
| 2009/0006756 | A1 | 1/2009 | Donley |

* cited by examiner

Primary Examiner — Kalpit Parikh
(74) Attorney, Agent, or Firm — Daniel D. Hill; Joanna G. Chiu

(57) ABSTRACT

A data processing system includes a system interconnect, a processor coupled to the system interconnect, and a cache coherency manager (CCM) coupled to the system interconnect. The processor includes a cache. A method includes generating, by the CCM, one or more snoop requests to the cache of the processor; storing the one or more snoop requests to the cache of the processor into a snoop queue; setting a cache enable indicator to indicate that the cache of the processor is to be disabled; in response to setting the cache enable indicator to indicate that the cache of the processor is to be disabled, selectively invalidating the one or more snoop requests to the cache of the processor, wherein the selectively invalidating is performed based on an invalidate snoop queue indicator of the processor; and disabling the cache.

20 Claims, 3 Drawing Sheets

US 8,918,591 B2

DATA PROCESSING SYSTEM HAVING SELECTIVE INVALIDATION OF SNOOP REQUESTS AND METHOD THEREFOR

BACKGROUND

1. Field

This disclosure relates generally to data processing, and more specifically, to a data processing system having selective invalidation of snoop requests and method therefor.

2. Related Art

In multi-processor data processing systems having multiple caches, a cache coherency manager (CCM) is sometimes used to ensure that coherency is maintained between the caches and main memory. The CCM may use a method called snooping to maintain coherency and may include a queue of snoop transaction entries for each processor in the system. In some systems, snoop requests do not require an immediate response, so the queue may hold many entries for processing. Before the system can enter a low power mode, or perform another operation where the caches are taken off line, all of the pending snoop requests are first processed. This can take a significant amount of time, delaying subsequent operations of the data processing system.

Therefore, what is needed is a data processing system that solves the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
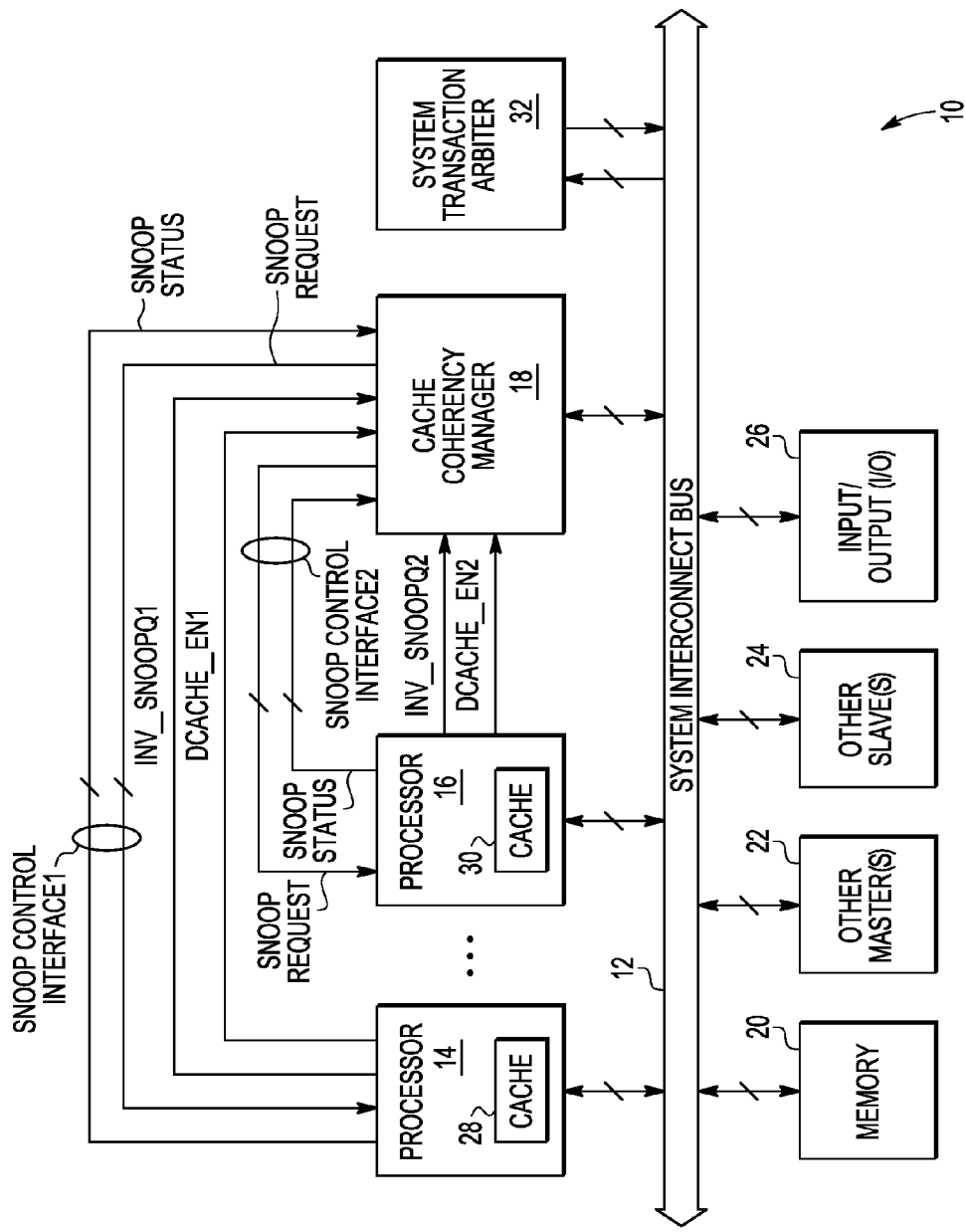
FIG. 1 is a block diagram of a data processing system according to one embodiment.

Generally, there is provided, a multi-processor data processing system having a cache coherency manager (CCM). Each of the processors has a cache that needs to maintain coherency with one or more other memories in the system. Snooping operations are used to maintain the coherency. The CCM controls the snooping operations and contains one or more queues of pending snoop operations. A "handshake" operation is provided in the disclosed embodiment in which the processor provides a control signal to indicate to the CCM to either complete pending snoop requests before disabling the cache, or invalidate the pending snoop entries in the snoop queue before disabling the cache based on a state of a snoop queue invalidate bit stored in a register of the processor. This selective control allows for either normal disabling, or disable with invalidate. In normal disabling, the pending snoop requests are completed before disabling the cache. In "disable with invalidate", the pending snoop requests are invalidated and not completed before disabling the cache. Both normal disabling and disable with invalidate are provided in the disclosed embodiment because not every disable will result in a cache invalidate. That is, certain types of cache disable requests must complete processing of pending snoop requests, for example, for entry into a low power mode in which cache contents will remain valid. In one embodiment, the snoop queue invalidate bit can be controlled by software running on the processor.

In one aspect, there is provided, in a data processing system having a system interconnect, a processor coupled to the system interconnect, and a cache coherency manager (CCM) coupled to the system interconnect, wherein the processor comprises a cache, a method comprising: generating, by the CCM, one or more snoop requests to the cache of the processor; storing the one or more snoop requests to the cache of the processor into a snoop queue; setting a cache enable indicator to indicate that the cache of the processor is to be disabled; in response to setting the cache enable indicator to indicate that the cache of the processor is to be disabled, selectively invalidating the one or more snoop requests to the cache of the processor, wherein the selectively invalidating is performed based on an invalidate snoop queue indicator of the processor; and disabling the cache. The method may further comprise: providing, by the processor, a cache enable signal to the CCM, wherein, in response to the cache enable indicator indicating that the cache is to be disabled, the processor sets the cache enable signal to indicate to the CCM that the cache is to be disabled. The CCM may comprise the snoop queue, and wherein the method may further comprise: providing, by the processor, an invalidate snoop queue signal to the CCM indicating whether or not to invalidate the one or more snoop requests to the cache of the processor. When the cache enable signal transitions from indicating that the cache is enabled to indicating that the cache is to be disabled, the one or more snoop requests to the cache of the processor in the snoop queue may be invalidated if the invalidate snoop queue signal has a first state and the one or more snoop requests to the cache of the processor may not be invalidated if the invalidate snoop queue signal has a second state. When the cache enable signal transitions from indicating that the cache is enabled to indicating that the cache is to be disabled, the one or more snoop requests to the cache of the processor may be completed prior to the step of disabling the cache if the invalidate snoop queue signal has the second state. Each of the cache enable indicator and the invalidate snoop queue indicator may be user programmable. The step of disabling the cache may performed when the processor enters a low power mode or a test mode. The data processing system may comprise a second processor coupled to the system interconnect, wherein the second processor comprises a cache, wherein the method may further comprise: generating, by the CCM, one or more snoop requests to the cache of the second processor; storing the one or more snoop requests to the cache of the second processor into a second snoop queue; setting a second cache enable indicator of the second processor to indicate that the cache of the second processor is to be disabled; in response to setting the second cache enable indicator to indicate that the cache of the second processor is to be disabled, selectively invalidating the one or more snoop requests to the cache of the second processor, wherein the selectively invalidating is performed based on a second invalidate snoop queue indicator of the second processor; and disabling the cache of the second processor. The method may further comprise: providing, by the second processor, to the CCM a second cache enable signal and a second invalidate snoop queue signal. The invalidate snoop queue indicator of the processor may indicate that the one or more snoop queue requests to the cache of the processor are invalidated in response to setting the cache enable indicator to indicate that the cache of the processor is to be disabled, and the second invalidate snoop queue indicator of the second processor may indicate that the one or more snoop requests to the cache of the second processor are not invalidated in response to setting the second cache enable indicator to indicate that the cache of the second processor is to be disabled.

In another aspect, there is provided, a data processing system, comprising: a system interconnect; a processor coupled to the system interconnect, wherein the processor comprises: a cache; first storage circuitry which stores an invalidate snoop queue indicator; and second storage circuitry which stores a cache enable indicator; and a cache coherency manager (CCM) coupled to the system interconnect, the cache coherency manager having a first snoop queue corresponding to the processor, wherein the cache coherency manager generates snoop requests for the processor which are stored in the first snoop queue, wherein, in response to the cache enable indicator being set to indicate that the cache of the processor is to be disabled, the snoop requests for the processor in the first snoop queue are selectively invalidated based on the invalidate snoop queue indicator. The processor may provide a cache enable signal, wherein the cache enable signal indicates to the CCM when the cache is to be disabled. The processor may provide an invalidate snoop queue signal to the CCM, wherein when the cache enable signal transitions from indicating that the cache is enabled to indicating that the cache is to be disabled, the invalidate snoop queue signal may indicate to the CCM whether or not to invalidate the one or more snoop requests to the cache of the processor. The processor may comprise a processor snoop queue, wherein, in response to the cache enable indicator indicating that the cache is to be disabled, the processor snoop queue is selectively invalidated based on the invalidate snoop queue indicator. The data processing system may further comprise: a second processor coupled to the system interconnect, wherein the second processor comprises: a second cache; third storage circuitry which stores a second invalidate snoop queue indicator; and fourth storage circuitry which stores a second cache enable indicator; wherein the cache coherency manager has a second snoop queue corresponding to the second processor, wherein the cache coherency manager generates snoop requests for the second processor which are stored in the second snoop queue, wherein, in response to the second cache enable indicator being set to indicate that the second cache of the second processor is to be disabled, the snoop requests for the second processor in the second snoop queue are selectively invalidated based on the second invalidate snoop queue indicator. The second processor may provide a second cache enable signal, wherein the second cache enable signal indicates to the CCM when the second cache is to be disabled; and the second processor may provide a second invalidate snoop queue signal to the CCM, wherein when the second cache enable signal transitions from indicating that the second cache is enabled to indicating that the second cache is to be disabled, the second invalidate snoop queue signal indicates to the CCM whether or not to invalidate the snoop requests for the second processor in the second snoop queue.

In yet another embodiment, a data processing system, comprising: a system interconnect; a processor coupled to the system interconnect, wherein the processor comprises: a cache; first storage circuitry which stores an invalidate snoop queue indicator; and second storage circuitry which stores a cache enable indicator; a cache coherency manager (CCM) coupled to the system interconnect, the cache coherency manager having a first snoop queue corresponding to the processor, wherein the cache coherency manager generates snoop requests for the processor which are stored in the first snoop queue; a cache enable signal provided from the processor to the CCM based on the cache enable indicator, wherein the cache enable signal indicates to the CCM when the cache is to be disabled; an invalidate snoop queue signal provided from the processor to the CCM based on the invalidate snoop queue indicator, wherein when the cache enable signal transitions from indicating that the cache is enabled to indicating that the cache is to be disabled, the invalidate snoop queue signal indicates to the CCM whether or not to invalidate snoop requests for the processor, wherein, in response to the cache enable signal transitioning from indicating that the cache is enabled to indicating that the cache is to be disabled, the CCM selectively invalidates the snoop requests for the processor in the first snoop queue based on the invalidate snoop queue signal. The processor may comprise a processor snoop queue, wherein, in response to the cache enable indicator indicating that the cache is to be disabled, the processor snoop queue is selectively invalidated based on the invalidate snoop queue indicator. The data processing system may further comprise: a second processor coupled to the system interconnect, wherein the processor comprises: a second cache; third storage circuitry which stores a second invalidate snoop queue indicator; and fourth storage circuitry which stores a second cache enable indicator; a second cache enable signal provided from the processor to the CCM based on the second cache enable indicator, wherein the second cache enable signal indicates to the CCM when the second cache is to be disabled; and a second invalidate snoop queue signal provided from the second processor to the CCM based on the second invalidate snoop queue indicator, wherein when the second cache enable signal transitions from indicating that the second cache is enabled to indicating that the second cache is to be disabled, the second invalidate snoop queue signal indicates to the CCM whether or not to invalidate snoop requests for the second processor, wherein the CCM has a second snoop queue corresponding to the second processor and the CCM generates snoop requests for the second processor which are stored in the second snoop queue, and wherein, in response to the second cache enable signal transitioning from indicating that the second cache is enabled to indicating that the second cache is to be disabled, the CCM selectively invalidates the snoop requests for the second processor in the second snoop queue based on the second invalidate snoop queue signal.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

FIG. 1 illustrates, in block diagram form, a data processing system 10 according to an embodiment. Data processing system 10 includes processor 14, processor 16, cache coherency manager (CCM) 18, system transaction arbiter 32, system memory 20, other master devices 22, other slave devices 24, and input/output (I/O) devices 26. The devices shown in FIG. 1 are communicatively coupled to a system interconnect 12 but may be coupled by other types of system interconnects in other embodiments. For example, the devices shown may be communicatively coupled by a system interconnect that includes a cross bar switch or other type of switch, or a system interconnect that includes a bus, multiple busses, and/or switches. In one embodiment, a system interconnect may include multiple signal lines for address, data, and control information.

System transaction arbiter 32 arbitrates among various masters of system 10 for transactions on a system interconnect 12. Input/output devices 26 may be any number of I/O devices such as keyboard controllers and communications ports. Other slave devices 24 may include memory devices such as a system cache (e.g. L2 cache), or any type of slave device or peripheral. Both devices 24 and 26 may be accessible by transactions on system interconnect 12 that are generated by the master devices of the system (e.g. processor 14, processor 16, or other master devices 22). In one embodiment, other master devices 22 includes other types of processors (e.g. a digital signal processor) or a direct memory access (DMA) device which can generate transactions on system interconnect 12. In one embodiment, each master device may also include a cache (not shown).

In the embodiment shown, system 10 includes a snoop control interface between the cache coherency manager 18 and each of the processors 14 and 16 for exchanging information regarding snooping operations. For example, system 10 includes SNOOP CONTROL INTERFACE 1 between processor 14 and CCM 18 and SNOOP CONTROL INTERFACE 2 between processor 16 and CCM 18. In the embodiment shown, both snoop control interfaces include snoop request lines (SNOOP REQUEST) and snoop status lines (SNOOP STATUS). Alternate embodiments may include more or different lines or signals within the snoop control interface.

System 10 includes a data cache enabled signal DCACHE_EN1 provided by processor 14 and communicated to CCM 18, and an invalidate snoop queue signal INV_SNOOPQ1 communicated from processor 14 to CCM 18. Also, system includes a data cache enabled signal DCACHE_EN2 provided by processor 16 and communicated to CCM 18, and an invalidate snoop queue signal INV_SNOOPQ2 communicated from processor 16 to CCM 18.

In other embodiments, other types of data systems may include different configurations and/or have additional circuitry. Also, other embodiments may not have all of the circuitry shown in FIG. 1. In one embodiment, some or all of the circuitry shown in FIG. 1 may be implemented on one integrated circuit. However, in other embodiments, system 10 may be implemented with multiple integrated circuits.

In one embodiment, system 10 may be implemented as part of an information system such as e.g. a computer, cell phone, PDA, electronic control circuitry of an automobile, or other type of system implementing a data processing system.

Cache coherency manager 18 (which may also be referred to as cache coherency logic) snoops system interconnect 12 for transactions and initiates snoop requests for various caches of system 10 (e.g. cache 28, cache 30). In one embodiment, CCM 18 can send invalidate type snoop requests to determine whether the caches of system 10 include the data operand (e.g. access address) of the transaction such that cache coherency can be maintained. In one embodiment, if a cache contains the data operand, then that cache will invalidate the data operand in response to the invalidate type snoop request. One example of a snoopable transaction is a write transaction by processor 16 to system memory 20 for writing data to a location in memory 20. In response to the transaction, CCM 18 may generate an invalidate type snoop request to the other caches (e.g. cache 28) to search for data of the same memory address. If a cache has an entry corresponding to the same memory address, then the cache would invalidate that data since an updated version is being provided to memory 20 on system interconnect 12. In an alternate embodiment, in response to the snoopable write transaction, cache coherency manager 18 may generate a flush type snoop request to the other caches, where, if a cache has an entry corresponding to the same address, the cache may respond to the flush type snoop request by sourcing write data from the cache and updating memory 20 with the new data if a matching entry is found. Other types of snoop requests may also be generated by CCM 18 to caches within system 10 based on one or more specific cache coherency protocols used by the various components of system 10. Such coherency protocols are well known by those skilled in the art, and may include MESI, MOESI, or other protocols and variants thereof. Note also that in alternate embodiments, the circuitry and functionality of CCM 18 can be distributed among some or all of the masters of system 10 or be located elsewhere in system 10.

In one embodiment, the snoop request signal interface between cache coherency manager 18 and each of processors 14 and 16 includes a request signal line for indicating that a snoop request is being made, a snoop command line indicating a command type to be performed in response to the type of transaction that generated the snoop, a snoop address line which is the address of the transaction being snooped, and a snoop request ID line (not shown), which is a value generated by cache coherency manager 18 identifying the snoop request. These signal lines may be multi-bit (either in parallel or serial in some embodiments) or single bit in some embodiments.

In some systems, caches 28 and 30 are periodically taken off-line during operation in a dedicated time-slot of normal system operation. During this time-slot, the caches are examined for hard and soft errors. This maintenance operation is used to ensure reliable system operation. The maintenance operation is generally performed by a BIST (built-in self test) algorithm. When complete, caches 28 and 30 are invalidated and then re-enabled for normal operation. At other times, such as during operation in a low power mode, caches 28 and 30 are disabled with an intention of bringing them back up at the end of low power mode in the same state. In any case when the cache is disabled, whether or not the cache is to be reactivated in the same state, all pending snoop requests for a corresponding processor are completed before the cache is disabled. Completing the snoop requests prior to disabling the cache can take a significant amount of time because multiple pending snoop requests may be present in a snoop queue corresponding to that specific cache. If the cache is disabled because of, for example, a maintenance operation on the cache, there may not be enough time in the time-slot to complete the snoop requests pending in the queue and check the cache before the time-slot expires.

The disclosed embodiment provides a mechanism to either complete the pending snoop requests before disabling the cache, or invalidate the pending entries in a snoop queue before disabling the cache based on a state of a snoop queue invalidate indicator bit that is stored in, for example, a register of the processor. In one embodiment, the snoop queue invalidate bit can be controlled by software running on the processor.

Figure 2:
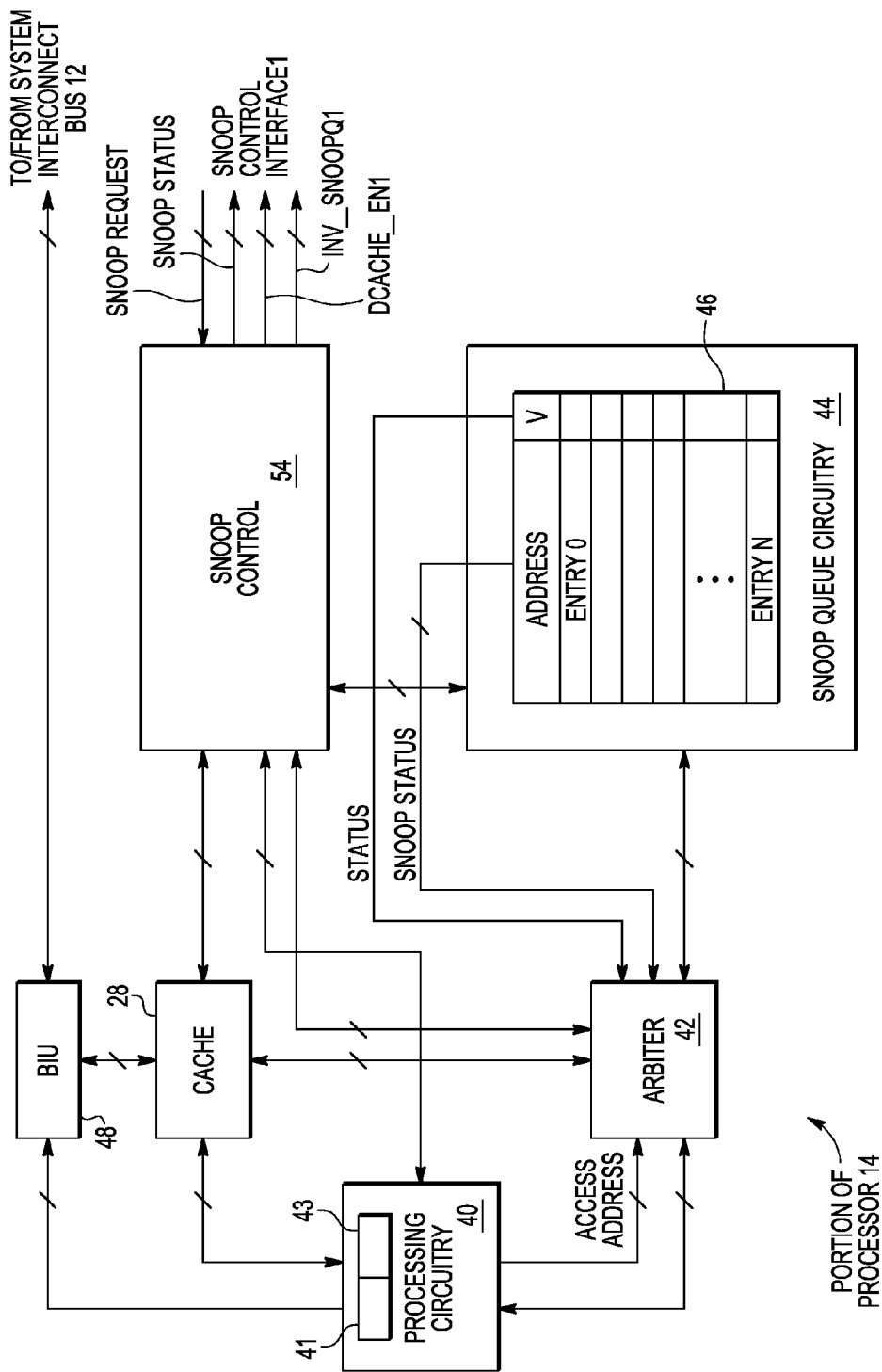
FIG. 2 is a block diagram of one embodiment of a portion of a processor of the data processing system of FIG. 1.

FIG. 2 is a block diagram of a portion of processor 14 of data processing system 10. In FIG. 2, processor 14 includes cache 28, processing circuitry 40, an arbiter 42, a bus interface unit (BIU) 48, snoop control 54, and snoop queue circuitry 44.

Processing circuitry 40 may include circuitry typically found in a processor such as e.g. an instruction pipe unit, execution units, an instruction fetch unit, control circuitry, general purpose registers, a load store unit, and a prefetch unit. Processors of other embodiments may include other types of circuitry.

In one embodiment, during processor operations, processing circuitry 40 executes instructions that generate requests for data to be read from system memory 20 (or other slave or I/O devices) and for data to be written to system memory 20 (or other slave or I/O devices). In response to a request for data having a system memory address (e.g. generated by a load/store unit or prefetch unit of circuitry 40) processing circuitry 40 will check cache 28 (via arbiter 42) to see if it has any data that corresponds to that system memory address. If not, a load store unit of processing circuitry 40 will generate via BIU 48 a transaction on system interconnect bus 12 to request data from memory 20 at that system address. In response to the read transaction, the system memory 20 will provide the requested data on system interconnect bus 12 to processor 14 wherein BIU 48 receives the data and provides the data to processing circuitry 40 and to cache 28 in some embodiments. After receiving the data by processor 14, the transaction is complete. Write transactions to memory 20 can be initiated by processor 14 where a write address and data are provided on interconnect bus 12 to be written to memory 20 at the address. Also, data may be written to or read from other slave devices 24 and I/O devices 26 of data processing system 10 in other embodiments.

Cache 28 may be an instruction cache, a data cache, or a combination of the two. The use of the term "data" herein in regards to a transaction may refer to the information stored in either an instruction cache or a data cache.

Processor 14 also includes circuitry for snoop request management. The snoop request circuitry operates to keep the data in cache 28 coherent with other copies of the data stored in memory 20 and other caches of data processing system 10. Snoop control 54 receives snoop requests from cache coherency manager 18 via the snoop control interface. Processor 14 includes snoop queue circuitry 44 including a snoop queue 46 for storing snoop requests received from the snoop control interface. In one embodiment, the snoop request queue 46 may be implemented as a FIFO. In one embodiment, the FIFO may be implemented as a circular buffer.

Within the snoop request queue 46 is a plurality of (N+1) entries where N is an integer. Each entry in the snoop request queue 46 has an address field and a status field that includes status information. The address field stores the address of the transaction for which a snoop request was generated. In the embodiment shown, a bit in the status field is a valid (V) bit which indicates whether the entry in the snoop request queue 46 is valid. Other types of status bits may be included in other embodiments. Also, each entry may include a snoop request ID field (not shown) that stores the snoop request ID for the snoop request generated by the cache coherency manager.

In operation, snoop control 54 and snoop queue circuitry 44 operate to keep cache 28 coherent with other copies of the information in system 10. Snooping is enabled by an active high signal DCACHE_EN1. Snoop control 54 receives a snoop request from cache coherency manager 18 via the snoop control interface and provides the address of the snoop request, to be stored in queue 46. The arbiter 42 arbitrates access to the cache 28 between the processing circuitry 40 and snoop queue circuitry 44 in an efficient manner to minimize the time that processing circuitry 40 does not have access to cache 28. The minimization of accesses to cache 28 by the snoop control circuitry may be accomplished in one embodiment, by selectively merging or collapsing two or more snoop address lookups into a single snoop address lookup.

Processing circuitry 40 has storage circuitry including a register bit field 41 and a register bit field 43. In another embodiment, the storage circuitry may be a random access memory or other storage unit and may be located external to processing circuitry 40. Register bit field 41 includes at least one control bit for indicating that the data cache 28 is enabled or disabled. When bit field 41 stores a logic one, data cache enable signal DCACHE_EN1 is provided by snoop control 54 to indicate to CCM 18 that data cache 28 is enabled. When bit field 41 stores a logic zero, data cache enable signal DCACHE_EN1 is provided by snoop control 54 of processor 14 to indicate to CCM 18 that data cache 28 is disabled. Bit field 43 includes at least one control bit for indicating whether to selectively flush or cancel (invalidate) pending snoop requests, or to manage a directory ownership or snoop filter by noting when the cache has been disabled. When bit field 43 is set to a logic one, invalidate snoop queue control signal INV_SNOOPQ1 indicates that snoop queue 46 is to be invalidated on cache disable. When bit field 43 is set to a logic zero, control signal INV_SNOOPQ1 indicates that snoop queue 46 is not to be invalidated but instead should be flushed. Control signal INV_SNOOPQ1 is sampled at the time when DCACHE_EN1 transitions to indicate whether snoop control 54 should flush snoop queue 46 or invalidate snoop queue 46 (See FIG. 4). In one embodiment, the snoop queue invalidate bit can be controlled by software running on the processor. Also, the data cache enable indicator and the invalidate snoop queue indicator may be user programmable. In addition, the cache may be disabled when the processor enters a low power mode or a test mode.

When a snoop request is received by snoop control 54, snoop control 54 routes the snoop address to the snoop queue circuitry 44. Various embodiments of the function of snoop queue circuitry 44 may be implemented. In one embodiment, all received snoop addresses from the snoop control 54 are stored in the snoop request queue 46. When arbiter 42 provides the snoop queue circuitry 44 with access to the cache 28, access addresses from the processing circuitry 40 are not permitted to cache 28 via the arbiter 42. In this mode of operation, arbiter 42 provides the snoop addresses from the snoop request queue 46 to the cache 28 for searching. The snoop addresses are removed from the snoop request queue 46 on a first-in, first-out (FIFO) basis.

When a snoop address is present in the snoop request queue 46, the snoop queue circuitry 44 signals arbiter 42 to request arbiter 42 to arbitrate for access to the cache 28. In one embodiment, cache 28 has a single set of address tags and therefore must be either be dedicated to the processor for addressing or to the snoop queue circuitry for addressing. When arbiter 42 prevents access by the processing circuitry 40 to cache 28, snoop addresses from circuitry 44 are routed through the arbiter 42 to the cache 28. Circuitry within the cache 28 compares the snoop address with all the addresses presently stored in the cache 28. If a match occurs, the matching entry in cache 28 is marked as invalid since it is potentially different from of the entry of the transaction on system interconnect bus 12. If no match occurs, no further action is taken within cache 28. In some embodiments, snoop control 54 may signal arbiter 42 to arbitrate for access to cache 28.

In one embodiment, snoop address compression may be performed by circuitry 44 to reduce the time that circuitry 44 has access to cache 28. In one form of snoop address compression, before a snoop address is outputted from the head of the snoop queue, a comparison of the next two or more snoop addresses is performed by comparison logic (not shown). The number of snoop addresses that are compared concurrently is a choice of design. When comparing two snoop addresses by circuitry 44, if the addresses have the same tag and index portions, the second address is not provided for snooping and a count value is created indicating that a pair of snoop addresses were combined or collapsed into one snoop address. A same tag and index portion for two addresses indicates that both addresses are within a same line of memory. By not sending both snoop addresses to the cache 28, the time that the cache 28 is diverted from the processing circuitry 40 for snooping is significantly reduced. See for example, U.S. Pat. No. 7,987,322 entitled "Snoop Request Management in a Data Processing System," having a common assignee all of which is incorporated by reference in its entirety.

In the embodiment shown, the snoop control interface includes a snoop request signal interface, a snoop status signal interface, a snoop acknowledgement signal interface, and a snoop error signal interface.

In one embodiment, the snoop request signal interface includes a request signal line for indicating that a request being made, a snoop command line indicating the type of bus transaction that generated the snoop, a snoop address line which is the address of the transaction being snooped, and a snoop request ID line (not shown), which is a number generated by the cache coherency manager identifying the snoop request. These signal lines may be multi-bit (either in parallel or serial in some embodiments) or single bit in some embodiments.

The snoop acknowledge signal interface is used to indicate to the cache coherency manager 18 that a snoop request has been processed by the cache. The snoop status interface provides the result of the cache snoop (e.g. whether an entry for the data address was found in the cache or not or whether an error (parity bit) was found with the data of the entry). In another embodiment, the snoop acknowledge interface may include a snoop response line and a snoop request ID line indicating the ID number of the snoop request (not shown). These lines may be multi-bit as well.

The snoop control interface includes a snoop error signal line. The snoop error signal line is used by the cache coherency manager 18 to indicate to a processor that a transaction generated by the processor resulted in an error from another cache when snooped. Examples of errors include whether another cache finds that the data associated with the snooped address had a parity error or an ECC error.

In other embodiments, system 10 may include processors of other configurations and/or that perform transactions and snoop operations in a different manner. For example, a processor may have other circuitry not shown in FIG. 2 or may not include all of the circuitry shown in FIG. 2. Also, a processor may include other circuitry for handling snoop requests in another manner as well. In addition, the above discussion regarding the operation of processor 14 also applies to the operation of processor 16.

Figure 3:
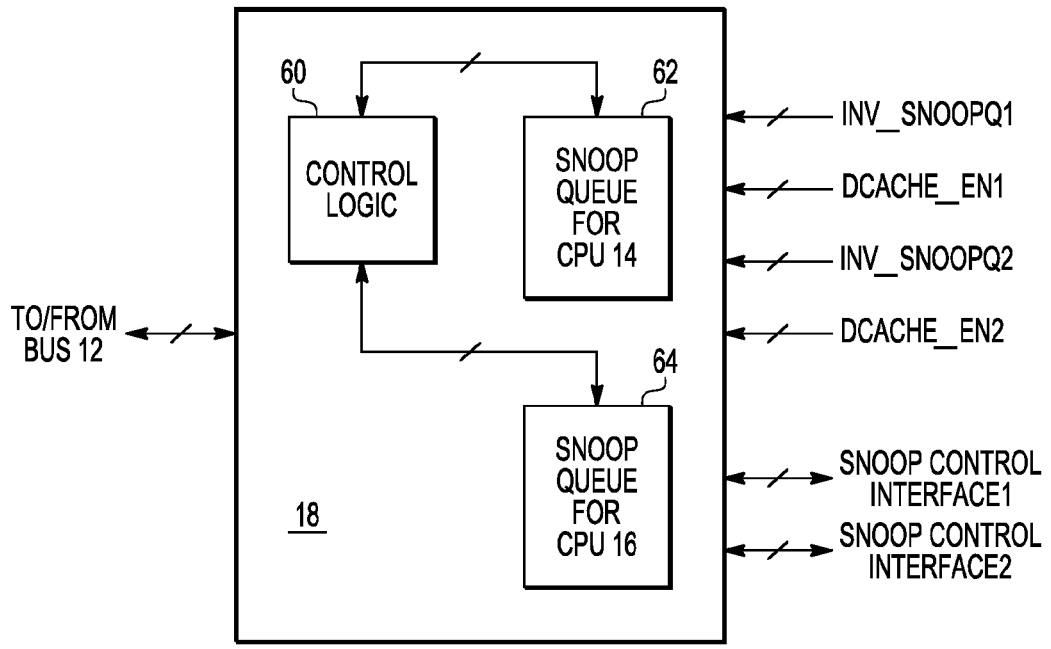
FIG. 3 is block diagram of one embodiment of a portion of a cache coherency manager according to one embodiment.

FIG. 3 is block diagram of one embodiment of a portion of CCM 18 of FIG. 1 according to one embodiment. Cache coherency manager 18 includes control logic 60, snoop queue 62 for processor 14, and snoop queue 64 for processor 16. In one embodiment, processors 14 and 16 may each be a central processing unit (CPU). Cache coherency manager 18 receives both of invalidate snoop queue signal INV_SNOOPQ1 and data cache enabled signal DCACHE_EN1 from processor 14. Cache coherency manager 18 receives both of invalidate snoop queue signal INV_SNOOPQ2 and data cache enabled signal DCACHE_EN2 from processor 16. Also, CCM 18 receives SNOOP CONTROL INTERFACE 1 and SNOOP CONTROL INTERFACE 2 as illustrated in FIG. 1.

Snoop queue 62 holds pending snoop requests for processor 14. Snoop queue 62 will subsequently transfer these pending requests to snoop queue 46 of snoop queue circuitry 44 when snoop queue 46 has available queue storage. Snoop queue entries to be processed by processor 14 are thus present in two queues, snoop queue 46 in processor 14, and snoop queue 62 in CCM 18. Similarly, snoop queue 64 holds pending snoop requests for processor 16 that will subsequently accept these pending requests when the corresponding snoop queue 46 of snoop queue circuitry 44 within processor 16 has available queue storage. Snoop queue entries to be processed by processor 16 are thus present in two queues, snoop queue 46 in processor 16, and snoop queue 64 in CCM 18.

As described above, control signals DCACHE_EN1 and/or DCACHE_EN2 are asserted as logic high signals by processor 14 or processor 16, respectively, to indicate to CCM 18 that the corresponding data cache is enabled or disabled. When one of the control signals is enabled, for example, DCACHE_EN1, upon disabling of control signal DCACHE_EN1, control signal INV_SNOOPQ1 is sampled. If INV_SNOOPQ1 is a logic high (one) when DCACHE_EN1 is disabled, snoop queue 62 is invalidated (along with snoop queue 46 of processor 14 in FIG. 2). If INV_SNOOPQ1 is a logic low (zero) there is no snoop queue invalidation and pending snoop requests are completed before cache 28 in processor 14 is disabled. Similarly, when DCACHE_EN2 is enabled, upon disabling of control DCACHE_EN2, control signal INV_SNOOPQ2 is sampled. If control signal INV_SNOOPQ2 is a logic high (one) when DCACHE_EN2 is disabled, snoop queue 64 is invalidated (along with snoop queue 46 of processor 16). If control signal INV_SNOOPQ2 is sampled as a logic low (zero), there is no snoop queue invalidation and pending snoop requests are completed before cache 30 in processor 16 is disabled.

Figure 4:
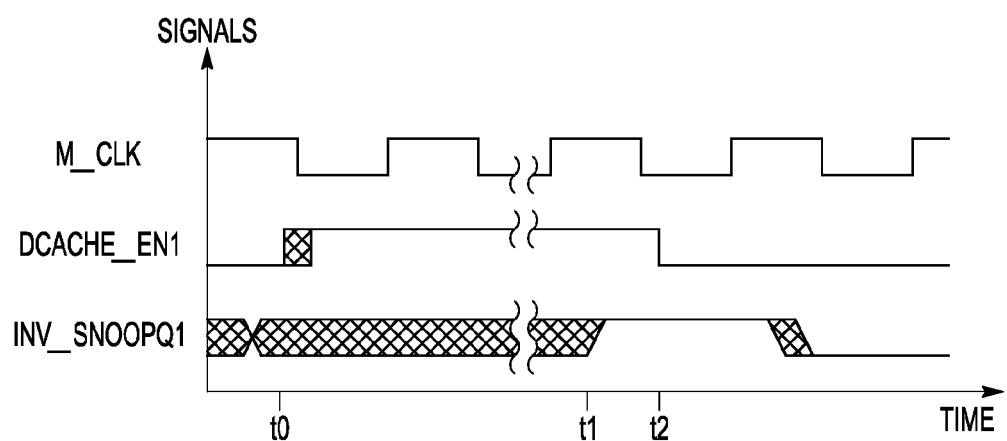
FIG. 4 is a timing diagram of various signals of the data processing system.

FIG. 4 is a timing diagram of a clock signal M_CLK, data cache enable signal DCACHE_EN1 and snoop queue invalidate signal INV_SNOOPQ1 of data processing system 10. The example of FIG. 4 is directed to processor 14, but can also be applied directly to processor 16. Clock signal M_CLK is used to provide timing for the various operations of data processing system 10. Clock signal M_CLK is not illustrated in FIGS. 1-3 but one of skill in the art will understand the function of clock signal M_CLK. As an example, data cache enabled signal DCACHE_EN1 is asserted as a logic high at time t0. At time t1, snoop queue invalidate signal INV_SNOOPQ1 is asserted as a logic high to indicate that when data cache 28 is disabled, CCM 18 causes snoop queue 62, corresponding to data cache 28, to be invalidated. At time t2, signal DCACHE_EN1 is disabled as a logic low, and signal INV_SNOOPQ1 is sampled. Snoop queue 62 is invalidated, as indicated by signal INV_SNOOPQ1 when data cache 28 is invalidated. Also, as an operation internal to processor 14, snoop queue 46 is invalidated.

In the case where control signal INV_SNOOPQ1 is a logic low (zero), when DCACHE_EN1 is disabled as a logic low, the logic low signal INV_SNOOPQ1 indicates to CCM 18 that all of the pending snoop requests in snoop queue 62 are to be completed before data cache 28 is disabled. Also, processor 14 will process all pending snoop queue entries in snoop queue 46.

The data cache enable indicator and the invalidate snoop queue indicator provide a handshake mechanism to allow the cache coherency manager to selectively drop all pending snoop requests for a specific processor of the system. This is in contrast to other systems that require pending snoop queue entries to be processed before a cache is disabled. Providing this handshake allows system performance to be improved by eliminating the time wasted processing unnecessary snoop operations. This also results in significant power savings because the unnecessary snoop operations over a loaded snoop port are eliminated along with the elimination of cache access cycles. For those cache disabling situations in which the cache contents are not needed to be maintained while the cache is disabled, the overhead of disabling the cache is thus minimized. In other situations in which the cache contents are to be preserved, it is necessary to complete all pending snoop operations prior to actually disabling the cache. The disclosed embodiments provide the flexibility to support both of these modes of operation by means of the invalidate snoop queue indicator.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a data processing system having a system interconnect, a first processor coupled to the system interconnect, and a cache coherency manager (CCM) coupled to the system interconnect, wherein the first processor comprises a first cache, a method comprising:
   generating, by the CCM, one or more first snoop requests to the first cache of the first processor;
   storing the one or more first snoop requests to the first cache of the processor into a first snoop queue;
   setting a first cache enable indicator to indicate that the first cache of the first processor is to be disabled;
   in response to setting the first cache enable indicator to indicate that the first cache of the first processor is to be disabled, selectively invalidating the one or more first snoop requests to the first cache of the first processor, wherein the selectively invalidating includes invalidating the one or more first snoop requests when a first invalidate snoop queue indicator of the first processor has a first state, and selectively invalidating also includes not invalidating and completing the one or more first snoop requests when the first invalidate snoop queue indicator has a second state that is different from the first state; and
   disabling the first cache.

2. The method of claim 1, further comprising:
providing, by the first processor, a cache enable signal to the CCM, wherein, in response to the first cache enable indicator indicating that the first cache is to be disabled, the first processor sets the cache enable signal to indicate to the CCM that the first cache is to be disabled.

3. The method of claim 2, wherein the CCM comprises the first snoop queue, and wherein the method further comprises:
providing, by the first processor, an invalidate snoop queue signal to the CCM indicating whether or not to invalidate the one or more first snoop requests to the first cache of the processor.

4. The method of claim 3, wherein:
when the cache enable signal transitions from indicating that the first cache is enabled to indicating that the first cache is to be disabled, the one or more first snoop requests to the first cache of the first processor in the first snoop queue are invalidated if the invalidate snoop queue signal has a first state and the one or more first snoop requests to the first cache of the first processor are not invalidated if the invalidate snoop queue signal has a second state.

5. The method of claim 1, wherein each of the first cache enable indicator and the first invalidate snoop queue indicator is user programmable.

6. The method of claim 1, wherein the step of disabling the first cache is performed when the first processor enters a low power mode.

7. The method of claim 1, wherein the step of disabling the first cache is performed when the first processor enters a test mode.

8. The method of claim 1, wherein the data processing system comprises a second processor coupled to the system interconnect, wherein the second processor comprises a second cache, wherein the method further comprises:
generating, by the CCM, one or more second snoop requests to the second cache of the second processor;
storing the one or more second snoop requests to the second cache of the second processor into a second snoop queue;
setting a second cache enable indicator of the second processor to indicate that the second cache of the second processor is to be disabled;
in response to setting the second cache enable indicator to indicate that the second cache of the second processor is to be disabled, selectively invalidating the one or more second snoop requests to the second cache of the second processor, wherein the selectively invalidating is performed based on a second invalidate snoop queue indicator of the second processor; and
disabling the second cache of the second processor.

9. The method of claim 8, further comprising:
providing, by the second processor, to the CCM a second cache enable signal and a second invalidate snoop queue signal.

10. The method of claim 9, wherein:
the first invalidate snoop queue indicator of the first processor indicates that the one or more first snoop queue requests to the first cache of the first processor are invalidated in response to setting the first cache enable indicator to indicate that the first cache of the first processor is to be disabled, and
the second invalidate snoop queue indicator of the second processor indicates that the one or more snoop requests to the second cache of the second processor are not invalidated in response to setting the second cache enable indicator to indicate that the second cache of the second processor is to be disabled.

11. In a data processing system having a system interconnect, a processor coupled to the system interconnect, and a cache coherency manager (CCM) coupled to the system interconnect, wherein the processor comprises a cache, a method comprising:
generating, by the CCM, one or more snoop requests to the cache of the processor wherein the CCM comprises a snoop queue;
storing the one or more snoop requests to the cache of the processor into the snoop queue;
providing, by the processor, an invalidate snoop queue signal to the CCM based on an invalidate snoop queue indicator of the processor, wherein the invalidate snoop queue signal indicates whether or not to invalidate the one or more snoop requests to the cache of the processor;
setting a cache enable indicator to indicate that the cache of the processor is to be disabled;
providing, by the processor, a cache enable signal to the CCM, wherein, in response to the cache enable indicator indicating that the cache is to be disabled, the processor sets the cache enable signal to indicate to the CCM that the cache is to be disabled;
in response to setting the cache enable indicator to indicate that the cache of the processor is to be disabled, selectively invalidating the one or more snoop requests to the cache of the processor, wherein the selectively invalidating is performed based on the invalidate snoop queue indicator of the processor, wherein when the cache enable signal transitions from indicating that the cache is enabled to indicating that the cache is to be disabled:
the one or more snoop requests to the cache of the processor in the snoop queue are invalidated if the invalidate snoop queue signal has a first state, and,
the one or more snoop requests to the cache of the processor are non invalidated and completed prior to the step of disabling the cache if the invalidate snoop queue signal has a second state; and
disabling the cache.

12. A data processing system, comprising:
a system interconnect;
a processor coupled to the system interconnect, wherein the processor comprises:
a cache;
first storage circuitry which stores an invalidate snoop queue indicator; and
second storage circuitry which stores a cache enable indicator; and
a cache coherency manager (CCM) coupled to the system interconnect, the cache coherency manager having a first snoop queue corresponding to the processor, wherein the cache coherency manager generates snoop requests for the processor which are stored in the first snoop queue, wherein, in response to the cache enable indicator being set to indicate that the cache of the processor is to be disabled, the snoop requests for the processor in the first snoop queue are selectively invalidated based on the invalidate snoop queue indicator, wherein selectively invalidating the snoop requests includes invalidating the snoop requests when the invalidate snoop queue indicator of the processor has a first state, and selectively invalidating also includes not invalidating and completing the snoop requests when the invalidate snoop queue indicator has a second state that is different from the first state.

13. The data processing system of claim 12, wherein the processor provides a cache enable signal, wherein the cache enable signal indicates to the CCM when the cache is to be disabled.

14. The data processing system of claim 13, wherein the processor provides an invalidate snoop queue signal to the CCM, wherein when the cache enable signal transitions from indicating that the cache is enabled to indicating that the cache is to be disabled, the invalidate snoop queue signal indicates to the CCM whether or not to invalidate the one or more snoop requests to the cache of the processor.

15. The data processing system of claim 12, wherein the processor comprises a processor snoop queue, wherein, in response to the cache enable indicator indicating that the cache is to be disabled, the processor snoop queue is selectively invalidated based on the invalidate snoop queue indicator.

16. The data processing system of claim 12, further comprising:
a second processor coupled to the system interconnect, wherein the second processor comprises:
a second cache;
third storage circuitry which stores a second invalidate snoop queue indicator; and
fourth storage circuitry which stores a second cache enable indicator;
wherein the cache coherency manager has a second snoop queue corresponding to the second processor, wherein the cache coherency manager generates snoop requests for the second processor which are stored in the second snoop queue, wherein, in response to the second cache enable indicator being set to indicate that the second cache of the second processor is to be disabled, the snoop requests for the second processor in the second snoop queue are selectively invalidated based on the second invalidate snoop queue indicator.

17. The data processing system of claim 16, wherein:
the second processor provides a second cache enable signal, wherein the second cache enable signal indicates to the CCM when the second cache is to be disabled; and
the second processor provides a second invalidate snoop queue signal to the CCM, wherein when the second cache enable signal transitions from indicating that the second cache is enabled to indicating that the second cache is to be disabled, the second invalidate snoop queue signal indicates to the CCM whether or not to invalidate the snoop requests for the second processor in the second snoop queue.

18. A data processing system, comprising:
a system interconnect;
a processor coupled to the system interconnect, wherein the processor comprises:
a cache;
first storage circuitry which stores an invalidate snoop queue indicator; and
second storage circuitry which stores a cache enable indicator;
a cache coherency manager (CCM) coupled to the system interconnect, the cache coherency manager having a first snoop queue corresponding to the processor, wherein the cache coherency manager generates snoop requests for the processor which are stored in the first snoop queue;
a cache enable signal provided from the processor to the CCM based on the cache enable indicator, wherein the cache enable signal indicates to the CCM when the cache is to be disabled;
an invalidate snoop queue signal provided from the processor to the CCM based on the invalidate snoop queue indicator, wherein when the cache enable signal transitions from indicating that the cache is enabled to indicating that the cache is to be disabled, the invalidate snoop queue signal indicates to the CCM whether or not to invalidate snoop requests for the processor, wherein, in response to the cache enable signal transitioning from indicating that the cache is enabled to indicating that the cache is to be disabled, the CCM selectively invalidates the snoop requests for the processor in the first snoop queue based on the invalidate snoop queue signal, wherein selectively invalidating the snoop requests includes invalidating the snoop requests when the invalidate snoop queue indicator of the processor has a first state, and selectively invalidating also includes not invalidating and completing the one or more first snoop requests when the invalidate snoop queue indicator has a second state that is different from the first state.

19. The data processing system of claim 18, wherein the processor comprises a processor snoop queue, wherein, in response to the cache enable indicator indicating that the cache is to be disabled, the processor snoop queue is selectively invalidated based on the invalidate snoop queue indicator.

20. The data processing system of claim 18, further comprising:
a second processor coupled to the system interconnect, wherein the second processor comprises:
a second cache;
third storage circuitry which stores a second invalidate snoop queue indicator; and
fourth storage circuitry which stores a second cache enable indicator;
a second cache enable signal provided from the second processor to the CCM based on the second cache enable indicator, wherein the second cache enable signal indicates to the CCM when the second cache is to be disabled; and
a second invalidate snoop queue signal provided from the second processor to the CCM based on the second invalidate snoop queue indicator, wherein when the second cache enable signal transitions from indicating that the second cache is enabled to indicating that the second cache is to be disabled, the second invalidate snoop queue signal indicates to the CCM whether or not to invalidate snoop requests for the second processor,
wherein the CCM has a second snoop queue corresponding to the second processor and the CCM generates snoop requests for the second processor which are stored in the second snoop queue, and wherein, in response to the second cache enable signal transitioning from indicating that the second cache is enabled to indicating that the second cache is to be disabled, the CCM selectively invalidates the snoop requests for the second processor in the second snoop queue based on the second invalidate snoop queue signal.

* * * * *